(12) United States Patent
Wandke et al.

(10) Patent No.: US 6,445,770 B1
(45) Date of Patent: Sep. 3, 2002

(54) THERMALLY ISOLATED X-RAY TUBE BEARING

(75) Inventors: Norman E. Wandke, Naperville; Mark S. Maska, Palatine; Donald C. Mueller, Aurora, all of IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/501,908

(22) Filed: Feb. 10, 2000

(51) Int. Cl.[7] ............................................. H01J 35/10
(52) U.S. Cl. .................... 378/132; 378/127; 378/128
(58) Field of Search ................... 378/127, 128, 378/132

(56) References Cited

U.S. PATENT DOCUMENTS

| | | | |
|---|---|---|---|
| 4,210,371 A | * 7/1980 | Gerkema et al. | 378/133 |
| 4,641,332 A | 2/1987 | Gerkema | 378/125 |
| 4,674,109 A | 6/1987 | Ono | 378/130 |
| 5,077,775 A | 12/1991 | Vetter | 378/132 |
| 5,150,398 A | * 9/1992 | Nishioka et al. | 378/132 |
| 5,224,142 A | * 6/1993 | Ono et al. | 378/128 |
| 5,384,818 A | * 1/1995 | Ono et al. | 378/132 |
| 5,809,106 A | * 9/1998 | Kitade et al. | 378/132 |

* cited by examiner

*Primary Examiner*—Robert H. Kim
*Assistant Examiner*—Allen C. Ho
(74) *Attorney, Agent, or Firm*—Fay, Sharpe, Fagan, Minnich & McKee, LLP (57) ABSTRACT

A high energy x-ray tube includes an evacuated chamber (12) containing a rotor (34) which rotates an anode (10) in the path of a stream of electrons (A) to generate an x-rays (B) and heat. The rotor includes a bearing shaft (54, 80, 122) connected to the anode by a thermally conductive structure (40). The bearing shaft carries soft metal-lubricated bearing balls (44F, 44R) in forward and rear bearing races (64, 66, 106, 108, 128, 130). An annular groove (70, 94, 132) is defined longitudinally in the shaft which, particularly when evacuated, provides a thermal barrier between the forward race and the portion of the shaft that is thermally connected with the anode. The groove lengthens the path heat entering the bearing shaft travels in order to reach the forward bearing race. As a result, the temperature of the forward race, and hence the evaporation of lubricant during operation of the x-ray tube, is reduced. The groove may be formed by electrical discharge machining the bearing shaft or by forming the shaft from inner and peripheral components (124, 126) which are connected together adjacent the rear bearing race (130).

19 Claims, 9 Drawing Sheets

THERMALLY ISOLATED X-RAY TUBE BEARING

BACKGROUND OF THE INVENTION

The present application relates to the heat distribution and vacuum tube arts. It finds particular application in conjunction with the rechannelling of by-product heat in rotating anode x-ray tubes and will be described in conjunction therewith.

A high power x-ray tube typically includes a thermionic filament cathode and an anode which are encased in an evacuated envelope. A heating current, commonly on the order of 2–5 amps, is applied through the filament to create a surrounding electron cloud. A high potential, on the order of 100–200 kilovolts, is applied between the filament cathode and the anode to accelerate the electrons from the cloud towards an anode target area. The electron beam impinges on a small area of the anode, or target area, with sufficient energy to generate x-rays. The acceleration of electrons causes a tube or anode current on the order of 5–600 milliamps. Only a small fraction of the energy of the electron beam is converted into x-rays, the majority of the energy being converted to heat which heats the anode white hot.

In high energy tubes, the anode rotates at high speeds during x-ray generation to spread the heat energy over a large area and inhibit the target area from overheating. The cathode and the envelope remain stationary. Due to the rotation of the anode, the electron beam does not dwell on the small impingement spot of the anode long enough to cause thermal deformation. The diameter of the anode is sufficiently large that in one rotation of the anode, each spot on the anode that was heated by the electron beam has substantially cooled before returning to be reheated by the electron beam.

The anode is typically rotated by an induction motor. The induction motor includes driving coils, which are placed outside the vacuum envelope, and a rotor with an armature and a bearing shaft, within the envelope, which is connected to the anode. When the motor is energized, the driving coils induce electric currents and magnetic fields in the armature which cause the armature and other portions of the rotor to rotate.

The temperature of the anode can be as high as 1,400° C. Part of the heat is transferred through the anode to the rotor, which includes the armature and the bearing shaft, which are both connected to the anode through a stem portion of the rotor. Heat travels through the bearing shaft to the bearing races and is transferred to the lubricated bearing balls carried by the races. The lubricants on the bearing balls become hot and tend to evaporate. X-ray tube bearing life is critical to high performance tube operation. Conduction and radiation from the hot target heat the bearing shaft and this heating can evaporate or otherwise degrade the ball bearing lubricant, leading to a rapid degradation of the bearing surfaces and premature tube failure.

Because x-ray tubes operate in a vacuum requiring low vapor pressure materials, petroleum-based lubricating compounds cannot be used. Thus, it is common in the industry to use solid metal lubricants, such as lead, on the bearing races. The evaporation of lead lubricant from a bearing race accelerates rapidly over 350° C. These temperatures can be reached in the bearing, primarily during processing, and also during field life. The evaporation of lubricant leads to a rapid degradation of the bearing surfaces and premature tube failure. In an x-ray tube, the front bearing race is physically closer to the hot target than the rear bearing. Because of this, the front bearing runs about 100° C. hotter than the rear bearing and fails at a much higher rate than the rear bearing.

To reduce lubricant evaporation, silver lubrication on the ball bearings is sometimes used in place of lead. Silver has a lower vapor pressure than lead and can be run at least 100° C. hotter than lead. However, silver lubrication has a number of drawbacks. It tends to react with the bearing steel if it becomes too hot and causes grain boundary cracking and premature failure of the bearing. Additionally, silver requires more starting and running torque than lead, due to its lower lubricity. The torque imparts more residual heat into the bearing, through frictional and eddy current induction heating of the bearing and surrounding rotor body components. Silver lubricating material also creates more noise during operation than lead.

In recent years, computerized tomography (CT) gantry rotation speeds have increased from about 60 rpm to 120 rpm. Higher gantry rotation speeds call for x-ray tubes with higher x-ray output densities. Again, increasing the x-ray output increases the heat output. The x-ray tubes typically need larger diameter rotating anodes to handle the increased heat output. This change has resulted in increased stresses on the rotor stem and bearing shaft. One way to reduce these stresses to a non-critical level is to reduce the length of the rotor stem while increasing the cross sectional area. This, however, shortens and widens the heat conduction path from the target to the bearing shaft, resulting in higher thermal transfer.

One way to reduce bearing temperatures is to provide a thermal block to isolate the bearing lubricant from the heat of the target. Many low power tubes do not have a thermal block of any kind. In these tubes, the rotor stem is screwed directly to the bearing shaft. The absence of a thermal block in the system causes the bearing shaft to run at a high temperature, especially during x-ray generation, and this can lead to evaporation of the bearing lubricant and failure of the x-ray tube.

A variety of thermal blocks have been developed for reducing the flow of heat from the anode to the bearing shaft. In one low power design, the rotor stem is brazed to a steel rotor body liner that is then screwed to the bearing shaft. This provides a slightly more thermally resistive path.

Another thermal block that has been used in the industry is known as a top-hat design. A top hat-shaped piece of low thermal conductivity material, such as Hastelloy™ or Inconel™, is screwed onto the hub of the x-ray bearing shaft. The rotor body is then attached to the brim of the top hat with screws, welds, or other fastening means. The thermal path from the rotor body to the bearing is then extended by the length of the top hat. Analysis shows that a 20–50° C. temperature decrease may be achieved at the front bearing race when the top hat design is employed.

The top hat design, however, has several disadvantages.

In CT x-ray tubes, the rotating anode assembly is a precision device, with the focal track runout kept to a few tens of micrometers or lower. For high power scanners, the tolerance requirements are even more stringent. Because of the narrow tolerances all of the x-ray tube components are highly precision machined and precisely assembled. The introduction of additional parts in the assembly increases the problems of maintaining a precise alignment. It is clearly much easier to align two components within desired tolerances than to align three or more components. Thus, the additional component introduced in the top hat design makes it more difficult to assemble the rotor to within design tolerances.

The top hat design also reduces the rigidity of the assembly because the additional length of the top hat tends to adds flexibility to the rotor structure. This can lead to excessive deflection of the target and focal spot and associated imaging problems.

Another thermal block has been formed by inserting a washer of a low conductivity material between the bearing hub and the rotor stem. The washer provides a slightly longer thermal path and additional thermal resistance between the rotor stem and the bearing. Thermal analysis shows a 10–20° C. reduction in temperature at the front bearing race when a washer is used. The washer thermal block has the same problems as the top hat design with respect to the additional tolerance stack-up. In addition, it is difficult to make the washer thick enough to provide the necessary heat blocking without introducing excessive deflection into the assembly.

Another method of reducing heat flow to the bearing shaft involves reducing the thermal contact areas and increasing the thermal contact resistance between the bearing shaft hub and the rotor stem. This is typically achieved by minimizing the surface area of the bearing hub and using a rough surface, so the contact resistance between the hub and rotor stem is maximized. Most manufacturers have already reduced the bearing contact areas as much as is practical. In a high performance x-ray tube, however, this is often insufficient for maintaining the bearing race temperatures at an acceptable level. The contact areas can only be reduced up to a certain point, beyond which plastic deformation occurs in the parts due to excessive stress. If plastic deformation were allowed to occur, a loose assembly would result, which could fail prematurely from excessive vibration.

Another method of reducing heat flow is to use a spiral groove bearing. The bearing has a series of spiral cuts formed in an exterior surface of the bearing adjacent a bearing race. The spiral groove bearing is a relatively complex, large bearing that employs a gallium alloy to transfer heat. The bearing shaft is limited to a rotational speed of about 60 Hz. This limits operating power of the x-ray tube. Conventional x-ray tube anodes run from 60 Hz to 180 Hz, which allow higher power protocols to be performed.

The present invention provides a new and improved x-ray tube and bearing assembly which overcomes the above referenced problems and others.

SUMMARY OF THE INVENTION

In accordance with one aspect of the present invention, an x-ray tube is provided. The tube includes an envelope which defines an evacuated chamber. A cathode is disposed within the chamber for providing a source of electrons. An anode is disposed within the chamber which is struck by the electrons and generates x-rays. A rotor rotates the anode relative to the cathode. The rotor includes a bearing shaft, connected with the anode, including an inner portion and a peripheral portion connected with the inner portion. The peripheral portion defines forward and rear bearing races in an exterior surface. The forward bearing race is closer to the anode than the rear bearing race. The inner and peripheral portions define an annular gap at least partially therebetween, which extends longitudinally into the bearing shaft and spaces a forward end of the inner portion from a forward end of the peripheral portion. The gap extends the path along which heat entering the bearing shaft through the inner portion forward end travels to reach the forward bearing race. Lubricated bearings are received by the forward and rear bearing races.

In accordance with another aspect of the present invention, a bearing member for an x-ray tube is provided. The bearing member includes a bearing shaft, including an inner cylindrical portion and a peripheral portion, connected with the inner portion. The peripheral portion defines at least a first annular bearing race, which is shaped to receive lubricated bearing members therein. An annular gap extends into the bearing shaft generally parallel with the peripheral surface and provides a thermal barrier between a portion of the peripheral portion adjacent the first bearing race and an adjacent portion of the inner portion. A connecting member extends from the inner portion for connecting the bearing member with an anode.

In accordance with another aspect of the present invention, a method of reducing evaporation of a bearing lubricant in an x-ray tube having an anode and a rotatable bearing shaft connected therewith is provided. The shaft defines a bearing race in an exterior surface thereof. The method includes channelling heat entering the bearing shaft from the anode around an annular insulation zone defined in the bearing shaft.

One advantage of the present invention is the provision of an effective thermal block for a bearing shaft of an x-ray tube rotor.

Another advantage of the present invention is that the temperature of the forward bearing race is reduced.

Yet another advantage of the present invention is that the length of the x-ray tube rotor and the number of components to be maintained in precision alignment are not increased.

Yet another advantage of the present invention resides in increased x-ray tube life.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components and in various steps and arrangements of steps. The drawings are only for purposes of illustrating a preferred embodiment, and are not to be construed as limiting the invention.

DETAILED DESCRIPTION OF THE PREFERRED EMBODIMENT

Figure 1:
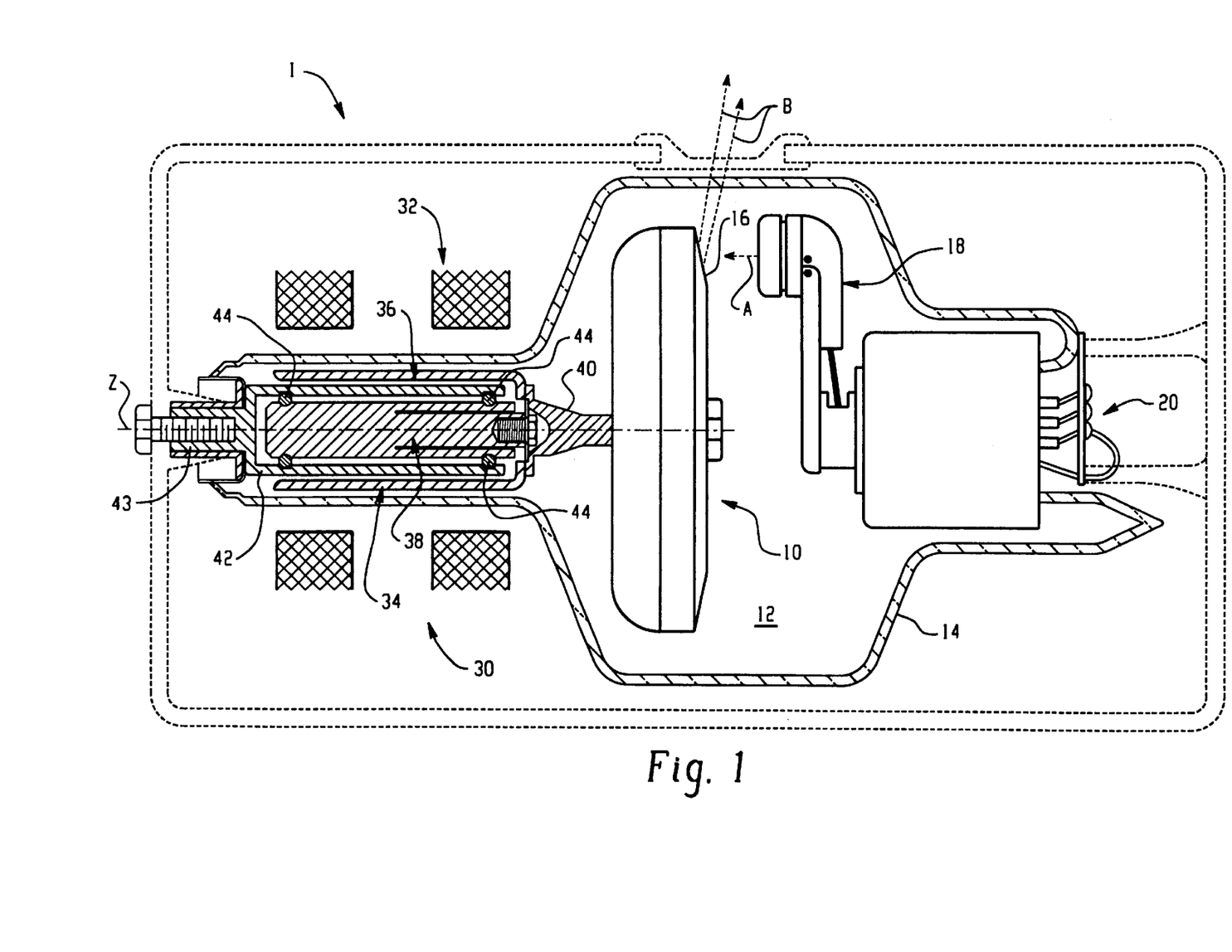
FIG. 1 is a schematic view of a rotating anode tube according to the present invention.

With reference to FIG. 1, a rotating anode x-ray tube 1 of the type used in medical diagnostic systems includes a rotating anode 10 which is operated in an evacuated chamber 12 defined by a vacuum envelope 14 which is formed from glass or other suitable material. The anode is disc-shaped and beveled adjacent its annular peripheral edge to define an anode surface or target area 16. A cathode assembly 18 supplies and focuses an electron beam A which strikes the anode surface 16. Filament leads 20 lead in through the glass envelope to the cathode assembly to supply an electrical current to the assembly. When the electron beam strikes the rotating anode, a portion of the beam is converted to x-rays B, which are emitted from the anode surface, and a beam of the x-rays passes out of the tube through the vacuum envelope 14.

An induction motor 30 rotates the anode 10. The induction motor includes a stator having driving coils 32, which are positioned outside the vacuum envelope, and a rotor 34, within the envelope, which is connected to the anode 10. The rotor includes an outer, cylindrical armature or sleeve portion 36 and an inner bearing member 38, which is axially aligned within the armature. The armature 36 and bearing member 38 are connected to the anode 10 by a neck 40 of molybdenum or other suitable material. The armature 36 is formed from a thermally and electrically conductive material, such as copper. When the motor is energized, the driving coils 32 induce magnetic fields in the armature which cause the armature and bearing member to rotate relative to a stationary, cylindrical rotor support 42, which is axially aligned with the armature and bearing member and is positioned therebetween. The rotor support is connected at a rearward end with a mounting stub 43, which extends through the envelope 14 for rigidly supporting the rotor support.

Figure 2:
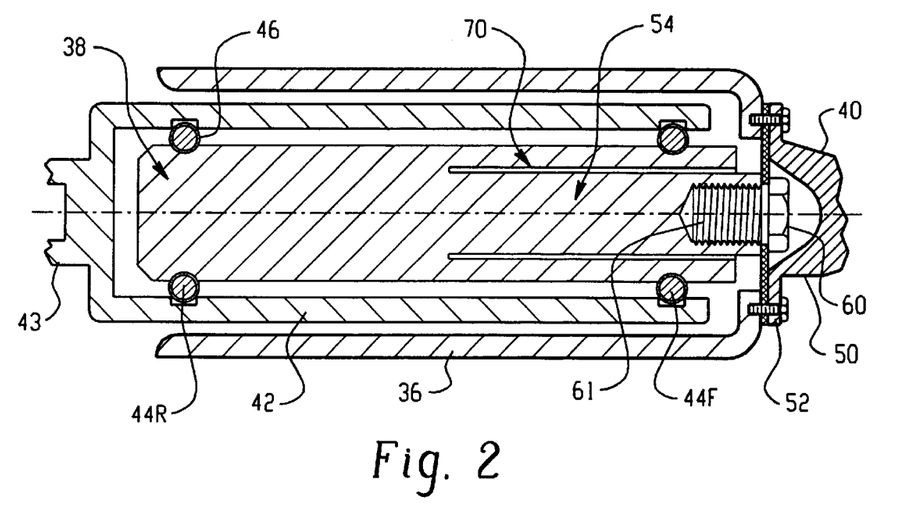
FIG. 2 is an enlarged sectional view of a grooved bearing member and neck of the x-ray tube of FIG. 1.
Figure 3:
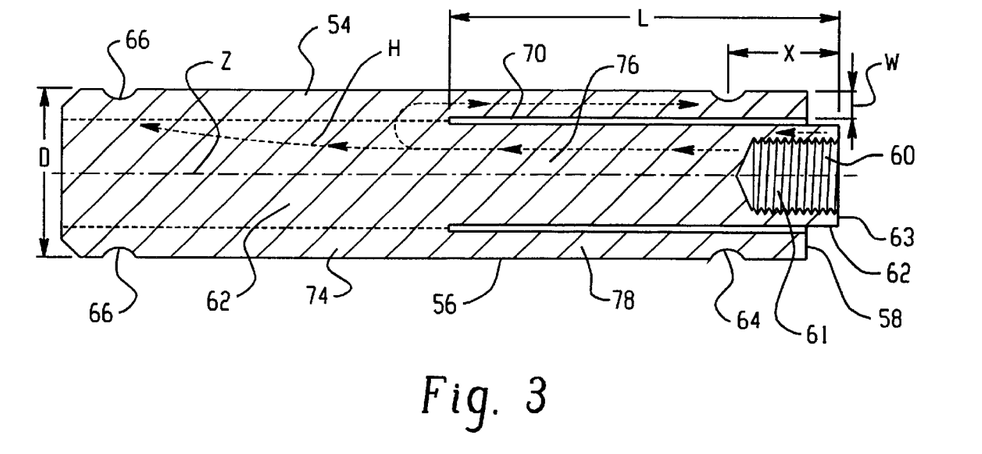
FIG. 3 is a sectional view of the bearing member of FIG. 2.

With reference also to FIGS. 2 and 3, bearings 44, such as ball or roller bearings, positioned between the bearing member 38 and the rotor support 42, allow the bearing member, armature 36, and anode 10 to rotate smoothly, relative to the rotor support 42. The bearing balls are coated with a lubricant 46 (not to scale), such as lead or silver at a thickness of about 1000–3000 Å. Preferably, the x-ray tube includes both forward and rear bearing balls 44F and 44R, respectively.

As used herein, the terms "forward," "rear," and the like, are used to define relative positions of components along an axis Z passing through the bearing member 38 and anode 10. Components which are described as forward are closer to the anode, while components described as rearward are further from the anode.

The neck 40 includes a stem portion So and a flange 52 which extends radially from a rearward end of the stem portion for connecting the neck with the armature. The bearing member 38 includes a generally cylindrical shaft 54 with a generally cylindrical outer surface 56 and a forward end 58. The bearing member is preferably mounted to the stem 50 by a fixing member, such as a bolt 60 through a centrally positioned, threaded bore 61. Alternatively, welding or brazing is used to mount the bearing member to the stem. A portion 62 of the bearing shaft, which defines the bore, extends forwardly of the forward end 58 to a forward face 63. The shaft is preferably fabricated from a material of low thermal conductivity, such as tool steel, for example, Rex 20™ or T15 tool steel.

Forward and rear bearing races 64 and 66, respectively, are defined in the outer, cylindrical surface 56 of the shaft 54. The forward bearing race 64 is closest to the anode 10. The bearing races are defined by annular recesses or grooves in the bearing shaft with a semicircular cross section for receiving the forward and rear bearing balls 44F and 44R, respectively.

An annular groove or gap 70 extends longitudinally into the interior of the bearing shaft 54, from the forward end 58 of the shaft, such that the groove runs generally parallel with, and spaced from, the outer surface 56 of the shaft. To maintain the balance of the shaft during rotation, the groove 70 is preferably axially aligned with the shaft 54 such that the longitudinal axis of the groove is on the longitudinal axis Z of the shaft.

As shown in FIG. 3, the groove is positioned directly adjacent the forward portion 62 to maximize the width in between the groove and the outer surface of the shaft. Alternatively, the groove is spaced from the forward portion, such that it runs closer to the outer surface 56.

The annular groove 70 is preferably machined into the bearing shaft 54 using electrical discharge machining (EDM), or other suitable machining methods. EDM has an advantage in that the bearing may be machined after heat treatment and hardening of the bearing, without affecting the physical properties of the bearing material.

The groove 70 preferably has a width in the range of 0.25–1.5 millimeters, more preferably, about 0.75 millimeters. Such a groove width is preferred for a 2.5 cm diameter shaft. A larger diameter shaft could accommodate a wider groove. For grooves of less than about 0.2 mm in width, it is difficult to machine the groove with conventional machining methods. Additionally, dirt may become trapped in a narrow groove, which is then difficult to flush out. The groove may be of any length, from about 0.2 cm, and may run almost the entire length of the bearing shaft (generally, bearing shafts are about 7 cm or more, in length). Preferably, the groove extends into the shaft to a position rearward of the forward bearing race 64. Most preferably, the groove extends to a position roughly mid-way between the forward and rear races, i.e. a sufficient length such that the temperature of the forward and rear races is approximately equal during operation of the x-ray tube.

The annular groove 70 is evacuated during evacuation of the x-ray tube to provide a vacuum gap between an inner cylindrical core portion 72 of the bearing shaft and an outer, annular portion 74 of the shaft which carries the races. Since the groove 70 is evacuated, it provides a thermal barrier between adjacent forward end regions 76, 78 of inner and outer portions 72, 74, respectively, of the shaft 54, which is of lower thermal conductivity than the tool steel of the adjacent shaft. Thus, a large portion of the heat entering the shaft from the anode is directed through the inner portion 72. During operation of the x-ray tube, heat enters the shaft 54 from the neck stem 50 through the core portion 72 and travels through the core portion to the end of the groove before entering the annular outer portion 74 of the shaft. Arrows H indicate the direction of heat flow.

It can be appreciated that as the length L of the groove increases, the path length to the forward bearing race, i.e. the distance that heat must travel through the bearing shaft to reach the forward race, increases. For example, in FIG. 3, the path length to the forward race 64, without the groove 70, would be a distance x (i.e. the distance of the forward race from the cylindrical forward portion 62, where heat would ordinarily enter the bearing shaft from the neck). With a groove of length L, the path length for a portion of the heat to travel to the forward race is a distance of about 2L-x (it will be appreciated that some of the heat still travels through the bearing shaft a distance x to the bearing race). Accordingly, the path length to the forward race for this portion of the heat is increased by a distance of about 2L-2x.

The temperature of a bearing race (and hence the bearings and lubricant) is dependent on the path length that heat must travel through the bearing shaft and also on the cross sectional area of the shaft. The groove both increases the path length and decreases the cross sectional area of the outer portion 74, and inner portion 72 at the forward end of the shaft, reducing the temperature of the forward bearing race. Thus, for reducing the temperature of the forward race, it is desirable to provide a length L of the groove which is as large as is possible. Above a certain groove length, however, the temperature of the rear bearing race 66 may be higher than the forward bearing race temperature, during operation. Thus, it may be desirable to have a groove which is less than the maximum practical length, to balance forward and rear bearing race temperatures. For most purposes, however, even when the groove runs almost the entire length of the shaft, the rear bearing race 66 tends to run at a lower temperature than without the groove. This is because the heat flow is reduced by the reduction in cross section of the central portion 72. Thus, the temperature at the rear bearing race is generally lower than for a conventional shaft of the same diameter D. Accordingly, overheating and evaporation of the lubricant will be reduced overall if the forward bearing race temperature is maintained at an acceptable level.

The length L of the groove can be varied to provide optimal rear and forward bearing race temperatures or a minimum temperature difference between the forward and rear races. While FIG. 3 shows a groove length L which extends about half way along the shaft, the groove may extend as far as the rear races 66, or beyond the rear races, if appropriate.

There are, however, some practical limitations to the length L of the groove 70 when the x-ray tube is to be rotated at high speed. The length L of the groove 70 and the width W of the shaft outer portion 78 are preferably selected such that the outer portion remains rigid during operation of the tube. If the width W of the outer portion is too narrow and/or the length of the groove is too long, the outer portion tends to flex during rotation of the anode leading to loss of alignment of the rotor and poor performance of the tube. For tool steel, such as Rex 20™ or T15 tool steel, the minimum width $W_{min}$ of the outer portion (adjacent the races) is preferably at least 0.10 cm. The maximum practical length of the groove may also depend on other factors, such as the material used for forming the bearing shaft, the overall diameter D of the shaft, and the operating speed of the rotor.

There is thus a compromise between the length of the annular groove 70 and the stiffness (i.e., rigidity or lack of deflection) of the bearing shaft. It is known that the deflection of a cantilever beam varies as the third power of its length. Accordingly, if deflection during operation of the tube is known for a given groove length, estimates of the deflection at other groove lengths can be made. Thus the groove depth can be optimized between the desired bearing shaft stiffness and the desired amount of thermal blocking.

X-ray tubes designed for higher gantry speeds commonly have relatively large diameter bearing shafts, of about 2–3 centimeters in diameter, or more. For such large diameter bearing shafts, the width W of the outer portion can be made relatively large and thus the groove length L can be longer without significantly impacting the stiffness. For shafts of about 2.5 cm in diameter and about 7.5 cm in length, designed to run at 120 rpm, a groove of about 2.5 cm in length is particularly preferred for providing a significant reduction in forward bearing race temperature without significantly impacting stiffness. For designs of bearing shaft having a diameter of around 1–1.5 centimeters, the maximum groove length will likely be shorter. However, even relatively short grooves of about 0.2 cm in length can have an impact on the forward bearing race temperature. Alternatively, bridge elements of insulating or low conductivity material can be inserted into the groove to limit flexing and increase stiffness. A resultant temperature reduction of only 10–20° C. may be sufficient, in some cases, to have a substantial effect on bearing lubricant evaporation, for example, when the groove 70 is combined with other thermal blocking techniques.

X-ray tubes formed with the grooved bearing shaft show a reduction in the temperature at the forward race 64 of over 200° C., i.e., from about 275° C. in a conventional shaft to about 65° C. with the grooved shaft.

Figure 4:
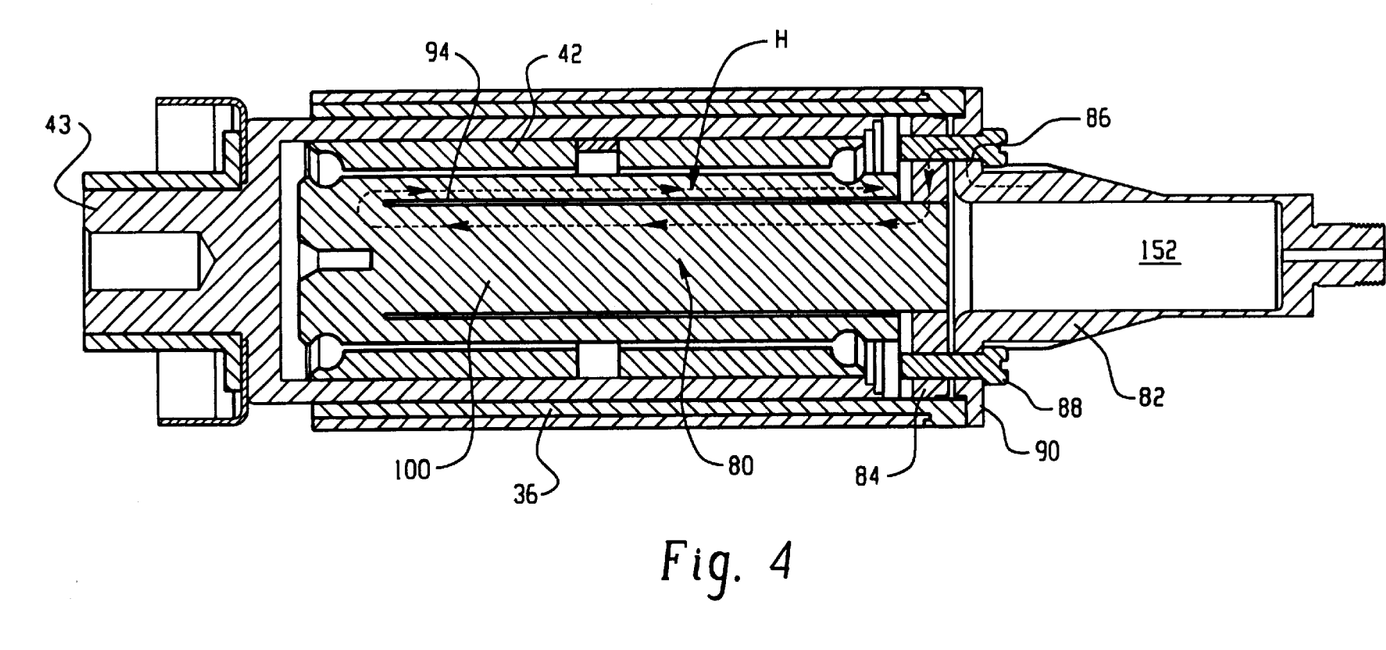
FIG. 4 is a sectional view of a second embodiment of a rotor and rotor support according to the present invention.
Figure 5:
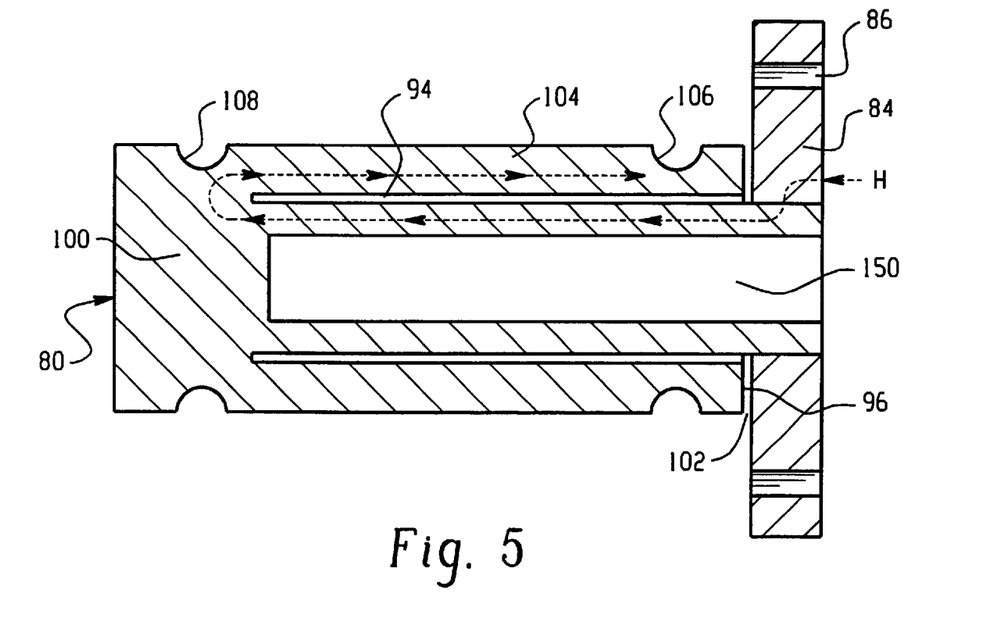
FIG. 5 is a sectional view of the bearing member of FIG. 4.
Figure 6:
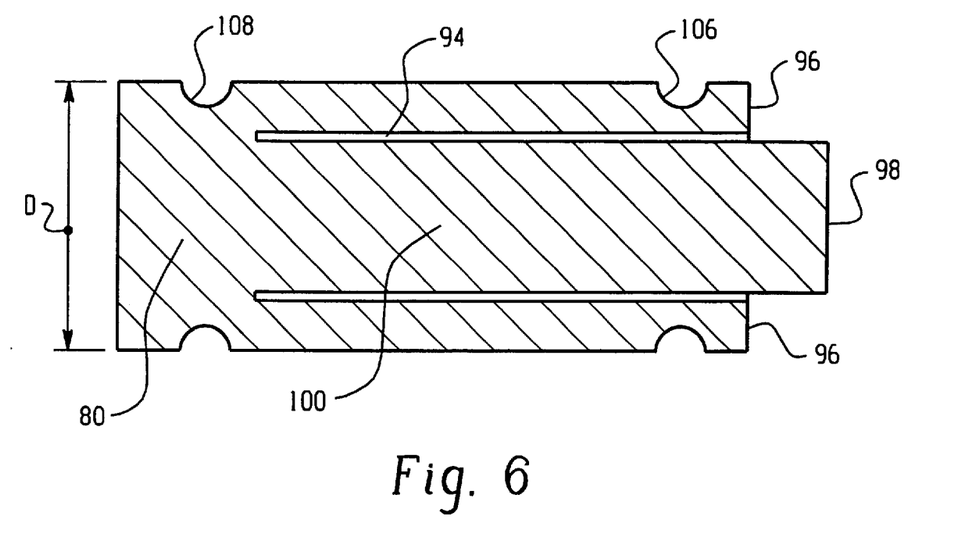
FIG. 6 is a sectional view of the bearing shaft of FIG. 5, prior to welding a hub to the forward end.

In an alternative embodiment, shown in FIGS. 4 and 5, a bearing shaft 80 is connected to a neck 82 of the rotor by an annular hub 84, which extends radially from the shaft at the neck end of the bearing member and includes suitably positioned holes 86. Machine screws 88, or other suitable fixing members, pass through suitably placed holes in the neck flange 90 and hub holes 86, to connect the neck with the hub. In this embodiment, the bearing shaft 80 and the bearing hub 84 are made separately. With reference also to FIG. 6, a groove 94 is formed in a forward face 96 of the shaft as for the groove 70 of FIGS. 2 and 3. A hub attachment portion 98 of a shaft inner portion 100, extends forwardly of the forward face, as shown in FIG. 6. The hub 84 is then welded, or otherwise securely attached, to 15 the attachment portion 98 of the shaft, leaving a narrow gap 102 between the hub and the forward face 96, to provide a thermal barrier therebetween. The assembly is then subjected to final machining, if necessary.

Heat H from the anode 10 enters the bearing shaft 80 through the hub 84 and travels through the shaft inner portion 100 to the end of the groove 94, before returning up an outer portion 104 of the shaft to the forward bearing race 106. While heat also travels to the rear bearing race 108, the heat flow is reduced by the reduction in cross section of the central portion 100. Thus, the temperature at the rear bearing race is generally lower than for a conventional shaft of the same diameter D.

Figure 7:
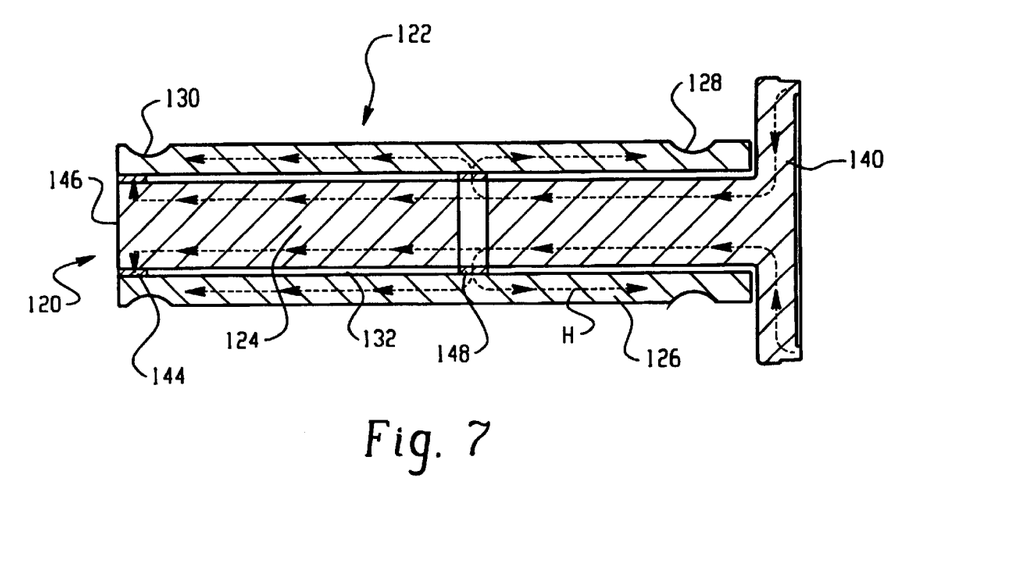
FIG. 7 is a sectional view of a bearing member with a two-part bearing shaft according to the present invention.
Figure 8:
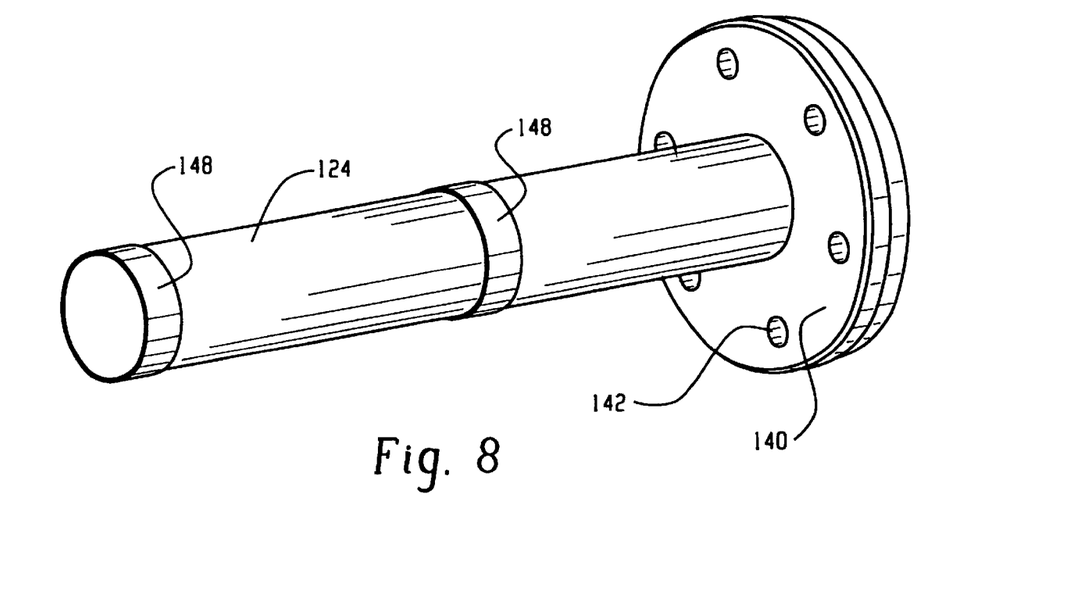
FIG. 8 is an enlarged perspective view of the central core and hub of the bearing member of FIG. 7.

With reference now to FIGS. 7 and 8, in another embodiment of a bearing member 120, a two-part bearing shaft 122 is formed from two pieces, namely, a solid, cylindrical inner core or inner shaft 124, that is connected to the anode, and a matching outer, hollow cylindrical race sleeve 126 that surrounds the inner shaft and defines forward and rear races 128, 130, respectively, in an outer surface thereof. Both parts 124, 126 are preferably manufactured from conventional bearing materials, such as tool steel.

The inner diameter of the race sleeve 126 is slightly larger than the diameter of inner shaft 124 such that a small annular gap 132 separates the two parts 124, 126, when assembled. The gap is of a similar width to the groove 70, 94 of FIGS. 1–6, i.e., from about 0.25 to about 1.5 millimeters, more preferably, about 0.75 millimeters in width. As with the grooves of FIGS. 1–6, the gap 132 is evacuated during assembly of the x-ray tube, providing a thermal barrier between the two parts 124, 126. The gap inhibits the conduction of heat H between the two parts and causes the heat to travel a longer distance from the neck to the forward bearing races 128. Since the temperature at the bearing races is proportional to the distance the heat has to travel, assuming the heat travels through the same area, the temperature at the inner races of the bearings is reduced.

With particular reference to FIG. 8, an annular bearing hub 140 is attached to a forward end of the inner core 124, either by welding the core to the hub, or by machining the core and the hub from the same piece of metal. The hub 140, extends radially from the inner core at the neck end of the bearing member and includes suitably positioned holes 142, preferably threaded. Screws (not shown), or other suitable fixing members, pass through suitably placed holes in the neck flange and are threadingly received in the hub holes 142, to connect the neck with the hub, like the embodiment of FIG. 4.

Optionally, one or more spacers or contact pads 148 are positioned in the gap between the inner core 124 and the race sleeve 126 to maintain the separation therebetween and limit vibration of the race sleeve relative to the core, during operation of the x-ray tube. The contact pads are preferably annular, i.e., generally cylindrical and hollow, with an outer diameter slightly greater than that of the core. Other configurations for the contact pads are also contemplated, such as a series of ribs, splines, three or more equally circumferentially spaced detents, pins extending through sleeve 126, and the like.

The contact pads 148 are preferably welded or otherwise firmly attached to the inner core 124. Alternatively, the contact pads are formed from the same material and are formed by machining the surface of the core. Or, the contact pads may be attached or machined in an inner surface of the race sleeve 126. In another embodiment, the contact pads are heat shrunk on to the core, by heating the contact pads (or by cooling the core) until they expand and then allowing the pads to shrink on the core. If the contact pads are formed as separate pieces, they are attached to the inner core or race sleeve prior to assembling the race sleeve and inner core together.

The contact pads 148 are preferably formed from a material of relatively low thermal conductivity, such as tool steel, or of even lower thermal conductivity than the core 124 or sleeve 126, such as ceramic, to minimize heat flow between the core and the race sleeve. The outer surface of the contact pad may be roughened or ribbed to decrease macroscopic contact between the race sleeve and the inner shaft. This further reduces heat transfer between the inner shaft and the race sleeve. The surface roughening is optionally achieved by abrasive blasting, EDM machining, coating, or the like.

The number, size, and placement of the contact pads 148 is preferably selected to provide the optimum compromise between reducing the heat transfer between the two pieces and adequate support of the bearing shaft during rotation.

In an alternative embodiment, the contact pads 148 are formed of a relatively high thermal conductivity material (greater than that of the race sleeve or inner core) to selectively encourage heat transfer between the parts 124, 126 at a position which is optimally spaced between forward and rear races in order to equalize bearing race temperatures or reduce the temperature difference therebetween. This embodiment may be employed, for example, when the rear bearing race would otherwise run at a hotter temperature than the forward bearing race.

The inner core 124 and the outer race sleeve 126 are connected together so that they rotate as an integral unit during operation of the x-ray tube. In one embodiment, the race sleeve 126 is heated to expand the sleeve and allowed to cool on the core 124, thereby shrink fitting the race sleeve onto the inner core. This ensures a relatively narrow gap between the two parts. Preferably, the two parts are joined by welding them together, or by other secure fixing methods. A weld 144 is preferably formed at the rear end 146 of the bearing shaft. The gap thus extends almost the full length of the bearing shaft. In such a bearing shaft, the heat travels an extra 7 to 15 centimeters (depending on the length of the bearing shaft and position of the weld) to the forward race 128, through the highly thermally resistive bearing material, such as Rex20® or T15 tool steel. Because the temperature at the end of a conductivity path is reduced as the length is increased, given the same cross sectional area, the temperature at the forward bearing race is reduced accordingly, as compared with a conventional shaft.

The inner shaft 124 is preferably optimized for strength and resistance to deflection by maximizing its diameter while minimizing the gap between the two parts 124, 126. The shaft 124 may be hollow adjacent the rear bearing end to reduce the thermal transfer capacity.

With a two part bearing shaft 122, the temperature of the forward bearing race 128 may be decreased by about 100–150° C., without increasing the temperature in the rear race 130, as compared with a conventional bearing shaft.

With reference once more to FIG. 5, the embodiments of any of FIGS. 4–8 may be formed with a hollow bearing shaft inner portion or inner core 100, 124. A cavity 150 thus formed reduces the heat transfer even further by reducing the cross sectional area available for heat transfer into the bearing. For tool steel shafts, the inner portion or core may be bored out to up to about 70 percent of its diameter without appreciably affecting the rigidity of the shaft.

With reference to FIG. 4, any of the embodiments of FIGS. 4–8 may also or alternatively be formed with a hollow stem 82. A cavity 152 formed in the stem adjacent the bearing shaft reduces the heat transfer even further by reducing the cross sectional area available for heat transfer through the neck into the bearing.

Figure 9:
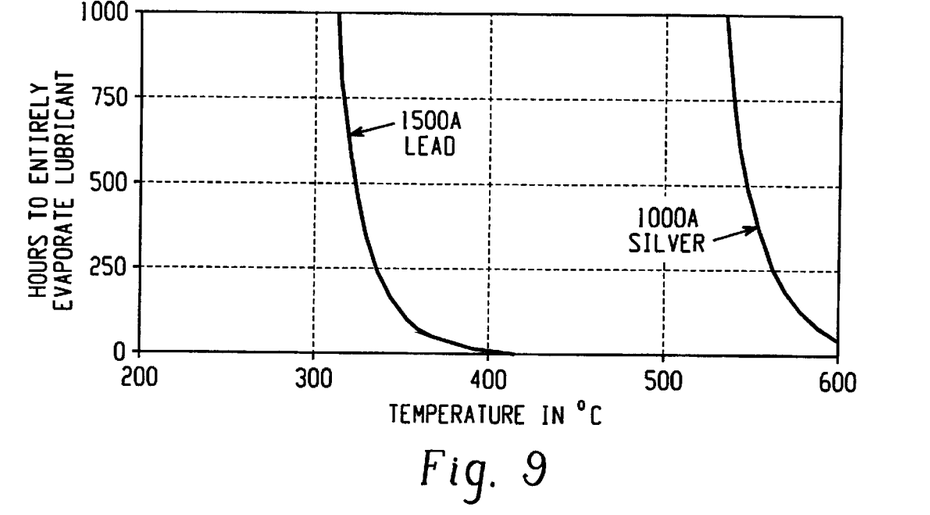
FIG. 9 is a plot of hours to entirely evaporate bearing lubricant from a bearing ball versus the temperature of the lubricant calculated for lead and silver lubricants.

With reference now to FIG. 9 a plot of calculated life of bearing lubricant with operating temperature is shown for two bearing lubricants, lead and silver. As shown in FIG. 9, there is an exponential decline in lubricant life (expressed as hours to entirely evaporate the lubricant) with increasing temperature. Thus, it can be seen that significant improvements in lubrication lifetime may be achieved by reducing the temperature of the forward bearing race by only a few degrees, even if the rear bearing temperature is increased by an equivalent amount. For example, for a lead bearing, a temperature reduction from 350° C. to 320° C. (i.e., a 30° C. drop in temperature) increases bearing lubrication life from less than 150 hours to 750 hours and a 40° C. drop to 310° C. increases the lifetime to 1000 hours.

Figure 10:
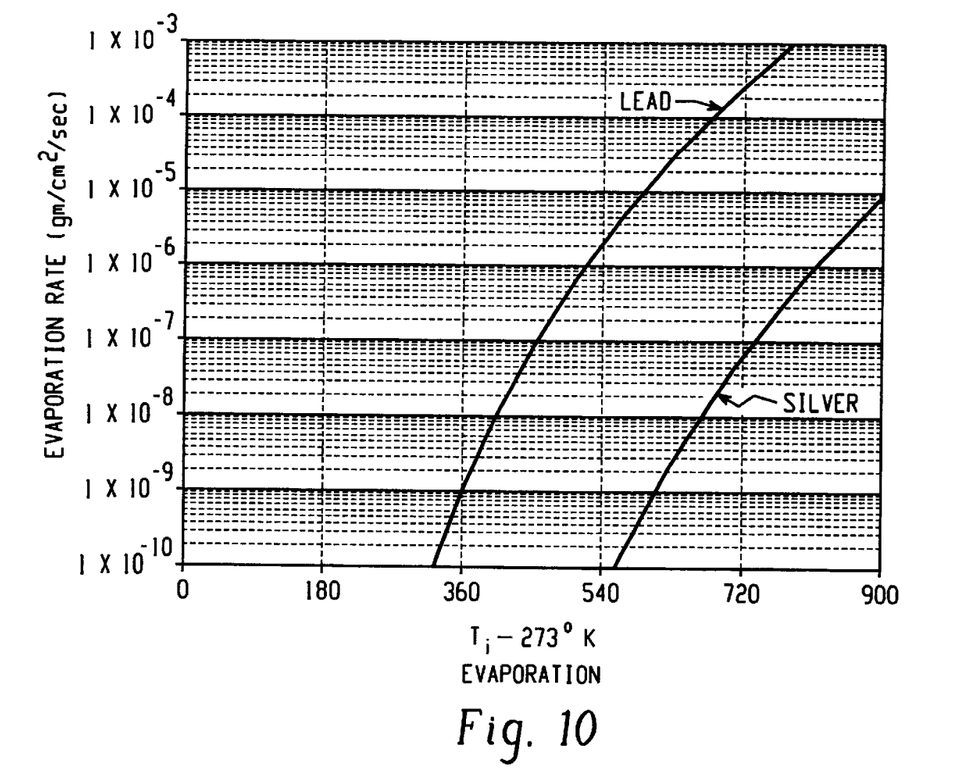
FIG. 10 is a plot of evaporation rate of lubricant versus temperature for calculated for lead and silver lubricants.

FIG. 9 is derived from calculations of the evaporation rates (in grams/square centimeter/second), shown in FIG. 10. The hours H to evaporate a lubricant (silver or lead) at temperature $T_i$ (in ° C.) are calculated by multiplying the evaporation rate measured by the lubricant available, as follows:

$$H = \frac{M}{E_i \times F \times 3600} \quad (1)$$

where

F is the area of lubricant surface exposed in $cm^2$ $E_i$ is the evaporation rate of the lubricant at temperature $T_i$ in $gm/cm^2/sec$ M is the mass of lubricant in gm The evaporation rates were calculated as follows:

Surface area F of a bearing ball of radius $r=4\pi r^2$

For a ball of radius 0.125 inches (0.3175 cm), the surface area F is 1.267 $cm^2$.

The initial weight $M_0$ of lubricant applied to each ball is approximately:

$$M_0 = F \times t \times \rho \quad (2)$$

where t is the thickness of lubricant applied in cm $\rho$ is the density of the lubricant in $gm/cm^3$ If the thickness t of the lubricant applied is 1500 Å (lead) or 1000 Å (silver), and the density $\rho$ of lead and silver are 11.34 $gm/cm^3$ and 10.500 $gm/cm^3$, respectively.

Then, for lead, $M_0=2.155\times10^{-4}$ g and for silver, $M_0=1.33\times10^{-4}$ g Evaporation rates for lead and silver in $gm/cm^2/sec$ where calculated using the following equation:

$$E_i = 10 \exp[(H-(0.5 \log T_i))-(G/T_i)] \quad (3)$$

Values for G and H were obtained from Duschman, *Scientific Foundations of Vacuum Technique*, Table 10.2, p. 700, as follows:

For lead, G=9710, H=7.69

For silver, G=14270, and H=8.63

Using values of $E_i$ calculated from Equation 3, the hours to evaporation may be estimated from Equation 1.

The temperature reductions achievable with the grooved or two-part bearing of the present invention make it favorable to use lead, rather than silver, as a bearing lubrication, providing several advantages in x-ray tube operation, such as reduced torque requirements and lowered noise levels in operation, as compared with a silver lubricant. Preferably, the groove or gap 70, 94, 132 reduces the temperature of the forward race 64, 106, 128 by at least 20° C., more preferably, by a temperature of up to about 200° C., or more, over that of a conventional x-ray tube. X-ray tubes formed with the groove or gap of the present invention will show extended tube life due to the increase in the time to failure of the forward bearings.

The two-part shaft and the grooved shaft embodiments of FIGS. 1–8, described above, may be used in combination with conventional thermal blocks, such as a top hat or washer of low thermal conductivity between the shaft and the neck, if desired, for further reducing the temperature of the bearing shaft and the forward race.

Without intending to limit the scope of the invention, the following examples illustrate the improvements which may be achieved in bearing race temperature distribution using grooved or two-part bearing shafts according to the present invention.

EXAMPLES

Example 1

Comparison of a Grooved Bearing Shaft with a Conventional Solid Shaft

The effect of a grooved bearing shaft on the bearing race temperatures was determined by comparing the temperature profile of a conventional solid tool steel shaft and the temperature profile of a grooved tool steel shaft 54, formed according to FIG. 2 of the present invention. The temperatures of the two shafts were determined by computer modeling techniques, using Finite Element Analysis.

Figure 11:
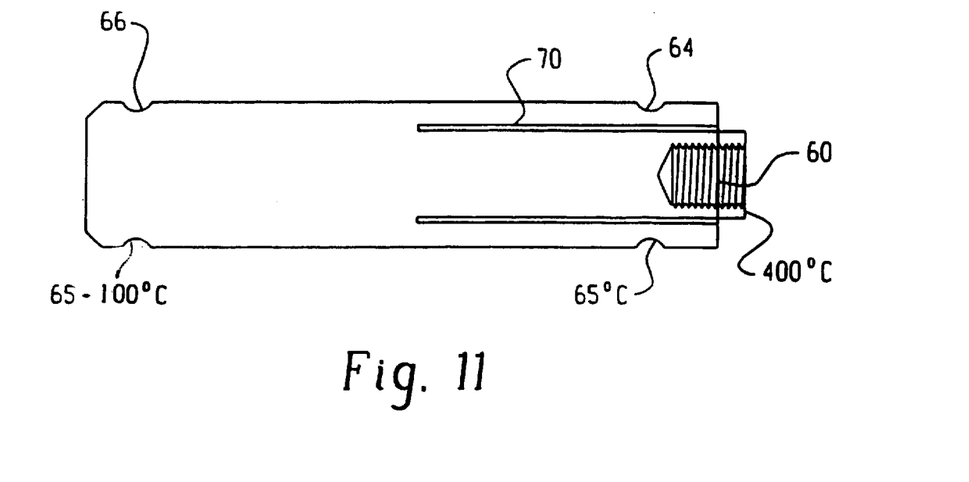
FIG. 11 is a thermal profile of a grooved bearing shaft formed according to the present invention when heated to 400° C. at the forward end of the bearing shaft.

As seen from FIG. 11, the groove 70 extended about half-way along the shaft, to a position between the rear and forward bearing races 64, 66 (but slightly closer to the forward bearing race). The forward ends 60 of the two bearing shafts were heated to 400° C. and the temperature profile of the shaft measured, while operating in a vacuum.

Figure 12:
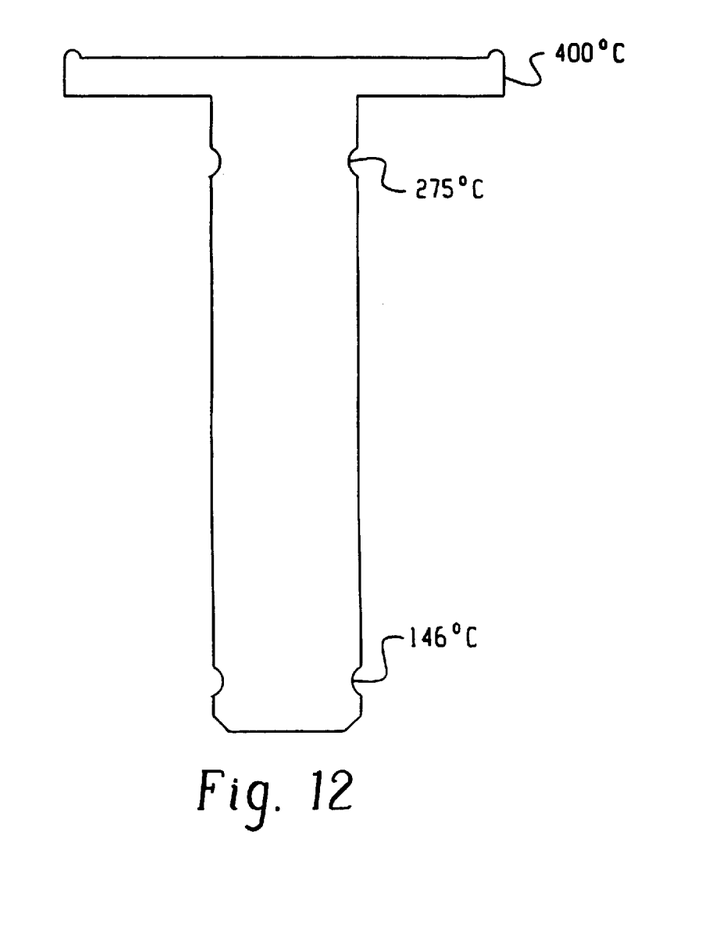
FIG. 12 is a thermal profile of a bearing shaft and hub of a conventional x-ray tube when heated to 400° C. at the hub.

With reference to FIGS. 11 and 12, the temperature profiles of the bearing shafts operated under these conditions show that the forward bearing race of the conventional shaft (FIG. 12) reached 275° C., while the temperature of the rear bearing race reached 146° C. Heat loss from the races was 500 $W/m^2K$.

In comparison, the forward bearing race of the grooved shaft according to the present invention (FIG. 11) reached only 65° C., 210° less than that of the conventional shaft. The temperature of the rear bearing race also reached about 65–100° C., also lower than that of the conventional shaft.

Accordingly, it can be expected that the x-ray tube with the grooved shaft of the present invention may be run for a longer time than a conventional x-ray tube, before the lubricant evaporates from the bearing races.

Example 2

Comparison of a Two-Part Bearing Shaft with a Conventional Solid Shaft

The effect of a two-part bearing shaft on the bearing race temperatures was determined by comparing the temperature profile of a conventional solid tool steel shaft and the temperature profile of a two-part tool steel shaft, formed according to the embodiment of FIGS. 7 and 8 of the present invention. As for Example 1, these temperature profiles were computer generated. The race sleeve 126 was welded to the rear end 146 of the inner shaft 124, adjacent the rear race 130. A spacer 148 was positioned approximately mid-way along the gap 132, between the forward and rear races 128, 130. Both shafts were connected to a hollow neck 40 by a bearing hub 140. The forward ends of the two necks were heated to 1200° C. and the temperature profile of the shaft measured, while operating in a vacuum.

Figure 13:
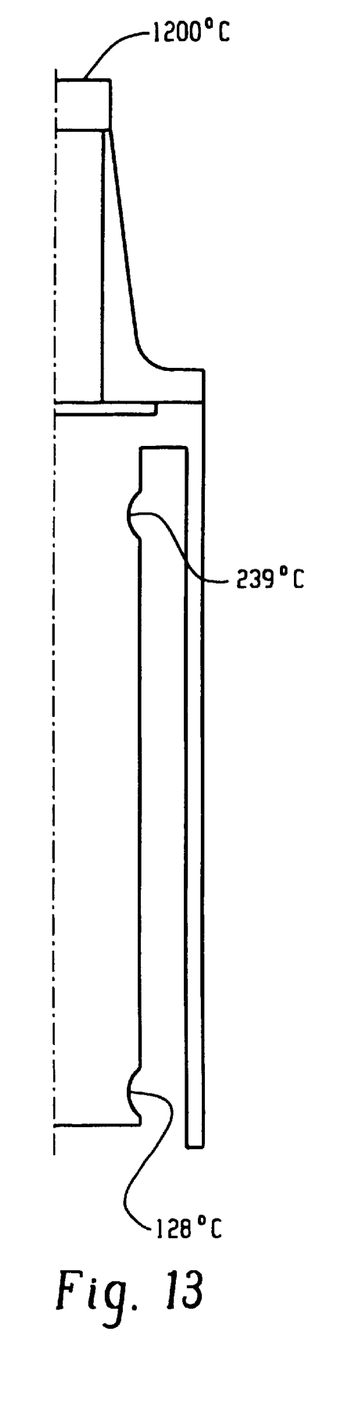
FIG. 13 is a thermal profile of a rotor of a conventional x-ray tube when heated to 1200° C. at the anode end of the neck.
Figure 14:
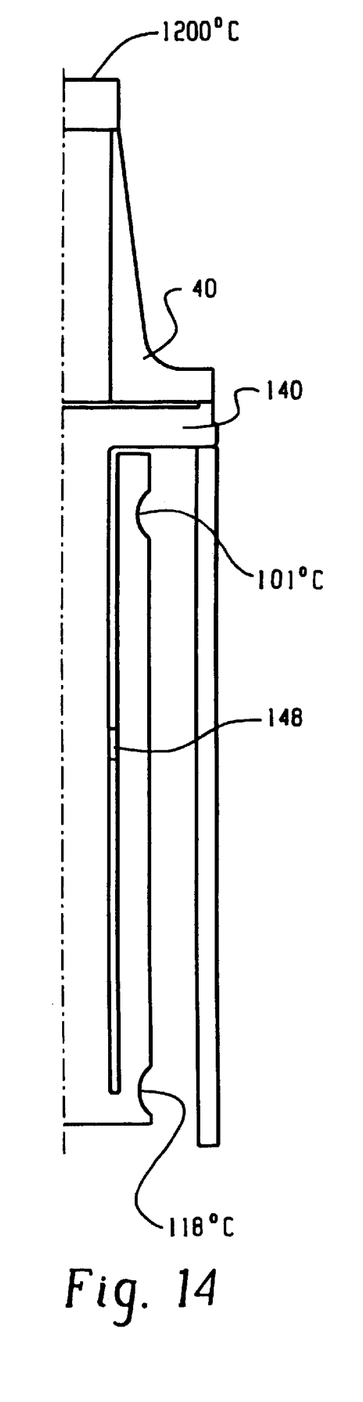
FIG. 14 is a thermal profile of a rotor with a two-part bearing shaft formed according to the present invention when heated to 1200° C. at the anode end of the neck.

With reference to FIGS. 13 and 14, the temperature profiles of the bearing shafts operated under these conditions show that the forward bearing race of the conventional shaft (FIG. 13) reached 239° C., while the temperature of the rear bearing race reached 128° C. Heat loss from the races was 500 $W/m^2K$.

In comparison, the forward bearing race of the two-part shaft according to the present invention (FIG. 14) reached only 101° C., 138° less than that of the conventional shaft. The temperature of the rear bearing race reached about 118° C., also lower than that of the conventional shaft, although slightly higher than the forward race of the two-part shaft.

By moving the spacer 148 slightly closer to the forward bearing race, or adding an additional spacer closer to the forward bearing race, the rear and forward bearing temperatures could be more closely matched.

Accordingly, it can be expected that the x-ray tube with the two-part shaft of the present invention may be run for a longer time than a conventional x-ray tube, before the lubricant evaporates from the bearing races.

Example 3

Comparison of Bearing Shaft Deflection with Groove Depth

Figure 15:
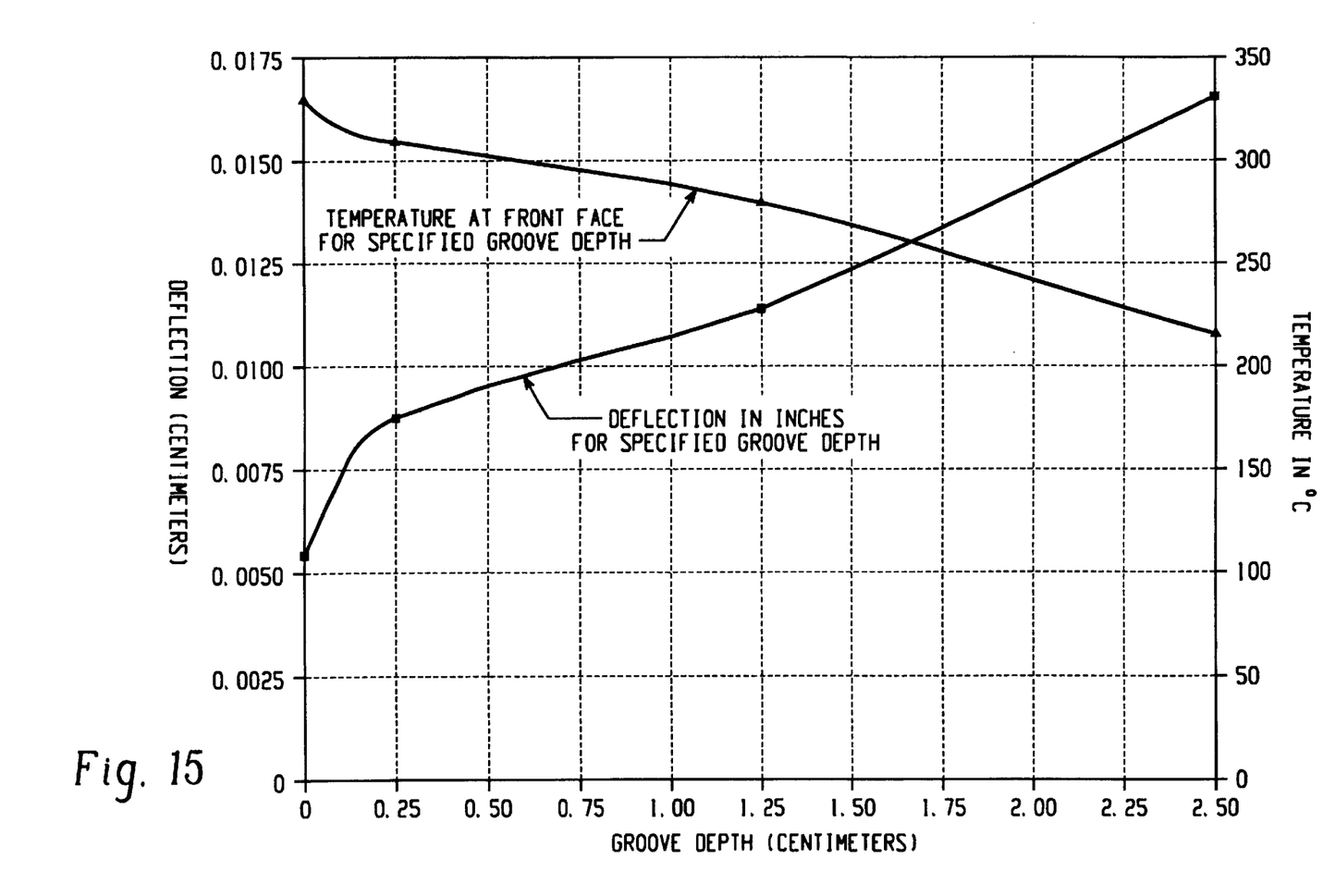
FIG. 15 is a plot of temperature at the forward race and deflection of a grooved bearing shaft against length of the groove.

Grooved bearing shafts were prepared by machining grooves of different depths between 0.0 and 2.5 cm in length in standard tool steel bearing shafts. For each of the grooves, the deflection in centimeters of the outer portion of the bearing shaft was measured under an uniform applied force. Additionally, the temperature of the forward race, after heating the forward end of each bearing shaft to the same temperature (400° C.), was calculated using computer models. FIG. 15 shows a plot of the measured deflection and forward bearing race temperature vs. groove length L (depth).

It can be seen that the deflection increases with groove length. The temperature of the forward race decreases with groove depth. A plot such as shown in FIG. 15 can thus be used to find a compromise groove depth which lowers the forward race temperature without causing unacceptable deflection. For example, for the tool steel shafts used in Example 3, if the maximum acceptable deflection is 0.0125 cm, the groove may be cut to a depth of about 1.5 cm and the temperature of the forward race will be reduced by about 60° C. as compared with a conventional shaft without a groove. Obviously these values will vary, depending on the shaft material, diameter, outer portion width, and the like.

The invention has been described with reference to the preferred embodiments. Obviously, modifications and alterations will occur to others upon reading and understanding the preceding detailed description. It is intended that the invention be construed as including all such modifications and alterations in so far as they come within the scope of the appended claims or the equivalents thereof.

Having thus described the preferred embodiment, the invention is now claimed to be:

1. An x-ray tube comprising:
   an envelope which defines an evacuated chamber;
   a cathode disposed within the chamber which provides a source of electrons;
   an anode disposed within the chamber which is struck by the electrons and generates x-rays;
   a rotor for rotating the anode relative to the cathode, the rotor including:
   a bearing shaft, connected with the anode, the bearing shaft including:
      an inner portion,
      a peripheral portion connected with the inner portion, the peripheral portion defining a forward bearing race and a rear bearing race on an exterior surface thereof, the forward bearing race being closer to the anode than the rear bearing race, and
      the inner portion and the peripheral portion defining an annular gap at least partially therebetween, the gap extending longitudinally into the bearing shaft to a position between the forward bearing race and the rear bearing race and spaces a forward end of the inner portion from a forward end of the peripheral portion; and
   lubricated bearings received by the forward bearing race and rear bearing race.

2. The x-ray tube of claim 1, wherein the inner portion and the peripheral portion are formed as a single component and the gap is formed by machining a groove into the bearing shaft.

3. The x-ray tube of claim 1, wherein the peripheral portion and the inner portion are separate components which are connected adjacent a rear end thereof.

4. The x-ray tube of claim 1, wherein the gap reduces the temperature of the forward race during operation of the x-ray tube by at least 20° C., as compared with an x-ray tube having a bearing shaft without a gap.

5. The x-ray tube of claim 1, wherein the gap has a width in the range of 0.025 to 1.5 millimeters.

6. An x-ray tube comprising:
   an envelope which defines an evacuated chamber;
   a cathode disposed within the chamber which provides a source of electrons;
   an anode disposed within the chamber which is struck by the electrons and generates x-rays;
   a bearing shaft, connected with the anode, the bearing shaft including:
      an inner portion,
      a peripheral portion connected with the inner portion, the peripheral portion having a forward bearing race and a rear bearing race on an exterior surface thereof, the forward bearing race being closer to the anode than the rear bearing race, the inner portion and the peripheral portion defining an annular gap at least partially therebetween which extends longitudinally into the bearing shaft and spaces a forward end of the inner portion from a forward end of the peripheral portion, and
      at least one contact element positioned within the gap between the forward end and the rear end to maintain separation and limit vibration, the contact element being longitudinally positioned between the forward bearing race and the rearward bearing race; and
   lubricated bearings received by the forward bearing race and rear bearing race.

7. The x-ray tube of claim 6, wherein the contact element includes a machined ring on one of an inner surface of the peripheral portion and a peripheral surface of the inner portion.

8. The x-ray tube of claim 6, wherein the contact element is formed as a separated component.

9. The x-ray tube of claim 6, wherein the contact element is formed from a material with a thermal conductivity which is at least as low as that of the bearing shaft peripheral portion.

10. The x-ray tube of claim 9, wherein the contact element is formed from a material of lower thermal conductivity than the bearing shaft peripheral portion.

11. An x-ray tube comprising:
   an envelope which defines an evacuated chamber;
   a cathode disposed within the chamber which provides a source of electrons;
   an anode disposed within the chamber which is struck by the electrons and generates x-rays;
   a rotor for rotating the anode relative to the cathode, the rotor including:

a bearing shaft, connected with the anode, the bearing shaft including:
  an inner portion,
    a peripheral portion connected with the inner portion, the peripheral portion and the inner portion being separate components which are connected adjacent a rear end thereof, the peripheral portion defining a forward bearing race and a rear bearing race in an exterior surface thereof, the forward bearing race being closer to the anode than the rear bearing race, and
    the inner portion and the peripheral portion defining an annular gap at least partially therebetween which extends longitudinally into the bearing shaft and spaces a forward end of the inner portion from a forward end of the peripheral portion;
    at least one contact element positioned within the gap between the forward end and the rear end, the contact element having a roughened contact surface which reduces heat flow from the inner portion to the peripheral portion through the contact element; and
  lubricated bearings received by the forward bearing race and rear bearing race.

12. The x-ray tube of claim 11, wherein the rotor further includes a neck which connects the bearing shaft with the anode.

13. An x-ray tube comprising:
  an envelope which defines an evacuated chamber;
  a cathode disposed within the chamber which provides a source of electrons;
  an anode disposed within the chamber which is struck by the electrons and generates x-rays;
  a rotor for rotating the anode relative to the cathode, the rotor including:
    a neck connected with the anode;
    a bearing shaft including:
      an inner portion,
        a peripheral portion connected with the inner portion, the peripheral portion having a forward bearing race and a rear bearing race in an exterior surface thereof, the forward bearing race being closer to the anode than the rear bearing race, and
        the inner portion and the peripheral portion having an annular gap at least partially therebetween which extends longitudinally into the bearing shaft and spaces a forward end of the inner portion from a forward end of the peripheral portion; and
    a hub which extends from the forward end of the inner portion of the bearing shaft and is connected with a flange on the neck; and
  lubricated bearings received by the forward bearing race and rear bearing race.

14. The x-ray tube of claim 13, wherein at least one of the neck and the inner portion of the bearing shaft includes a hollow, interior cavity which reduces the cross sectional area of a heat conduction path therethrough.

15. The x-ray tube of claim 13, wherein the annular gap extends rearward of the forward bearing race.

16. A bearing member for an x-ray tube, the bearing member comprising:
  a bearing shaft including:
    an inner cylindrical portion;
      a peripheral portion, connected with the inner portion, the peripheral portion defining a first annular bearing race and a second annular bearing race in an outer surface thereof, the race being shaped to receive lubricated bearing members therein;
      an annular gap which extends into the bearing shaft generally parallel with the peripheral surface, and provides a thermal barrier between a portion of the peripheral portion adjacent the first bearing race and an adjacent portion of the inner portion;
      a spacer within the gap at a location between the first and second bearing races, the spacer having reduced thermal conductivity relative to the inner cylindrical portion; and
      a connecting member which extends from the inner portion, for connection with an anode.

17. A method of reducing evaporation of a bearing lubricant in an x-ray tube having an anode and a rotatable bearing shaft connected therewith, the shaft defining forward and rear bearing races on an exterior surface thereof, the method comprising:
  forming the bearing shaft with an annular gap defined in the bearing shaft between an inner component and a peripheral component defining the exterior surface;
  positioning a spacer in the gap between the inner component and the peripheral component, the spacer being positioned rearward of the forward bearing race; and
  channeling heat entering the bearing shaft from the anode past the forward bearing race along the inner component, a fraction of the heat flowing through the spacer and the peripheral component to the forward bearing race.

18. The method of claim 17, further including the step of forming the gap by machining a groove in the bearing shaft, which is generally parallel with the exterior surface.

19. The method of claim 17, wherein the inner component and the peripheral component are separate elements and further including:
  connecting the inner component with the peripheral component at selected points leaving the gap between the inner component and the peripheral component.

* * * * *